US008109036B1

(12) United States Patent
Wilbanks

(10) Patent No.: US 8,109,036 B1
(45) Date of Patent: Feb. 7, 2012

(54) MIDGE/MOSQUITO TRAP SYSTEM

(76) Inventor: Alvin D. Wilbanks, Mexico, MO (US)

( * ) Notice: Subject to any disclaimer, the term of this patent is extended or adjusted under 35 U.S.C. 154(b) by 427 days.

(21) Appl. No.: 12/454,459

(22) Filed: May 18, 2009

Related U.S. Application Data

(63) Continuation-in-part of application No. 10/445,584, filed on May 27, 2003, now Pat. No. 7,832,140, which is a continuation of application No. 09/009,122, filed on Jan. 20, 1998, now Pat. No. 6,568,124, which is a continuation-in-part of application No. 08/761,282, filed on Dec. 6, 1996, now Pat. No. 6,050,025, which is a continuation-in-part of application No. 08/395,910, filed on Feb. 28, 1995, now Pat. No. 5,595,018.

(51) Int. Cl.
    *A01K 77/00* (2006.01)
(52) U.S. Cl. ............ 43/112; 43/139; 43/113
(58) Field of Classification Search ............ 43/112, 43/139, 113
    See application file for complete search history.

(56) References Cited

U.S. PATENT DOCUMENTS

| | | | | |
|---|---|---|---|---|
| 4,696,126 A | * | 9/1987 | Grothaus et al. | 43/112 |
| 5,255,468 A | * | 10/1993 | Cheshire, Jr. | 43/113 |
| 5,301,458 A | * | 4/1994 | Deyoreo et al. | 43/139 |
| 5,799,436 A | * | 9/1998 | Nolen et al. | 43/112 |
| 6,618,984 B1 | * | 9/2003 | Li | 43/112 |
| 6,655,080 B2 | * | 12/2003 | Spiro et al. | 43/139 |
| 7,243,458 B2 | * | 7/2007 | Miller et al. | 43/139 |
| 7,832,140 B2 | * | 11/2010 | Wilbanks | 43/112 |
| 2005/0126068 A1 | * | 6/2005 | Welch | 43/112 |

* cited by examiner

*Primary Examiner* — Christopher P Ellis

(57) ABSTRACT

A chamber has upper end and lower ends. A base has an annular trough receiving and supporting the lower end of the chamber. When water is within the trough, air flowing through slots in the lower end of the chamber becomes moisture laden. A fan in the chamber directs the air flow in a recirculating path of travel. A carbon dioxide tank in the chamber dispenses carbon dioxide into the recirculating path of travel of the air flow. A solenoid has an input line coupling the tank and the solenoid and an output line with an exterior extent with apertures and a foam covering constituting a reservoir. A control assembly activates and inactivates the fan and the carbon dioxide tank in a timed sequence.

4 Claims, 12 Drawing Sheets

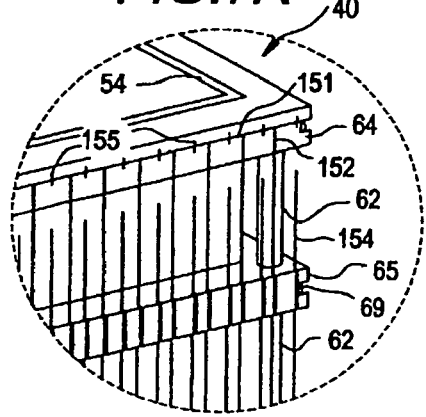
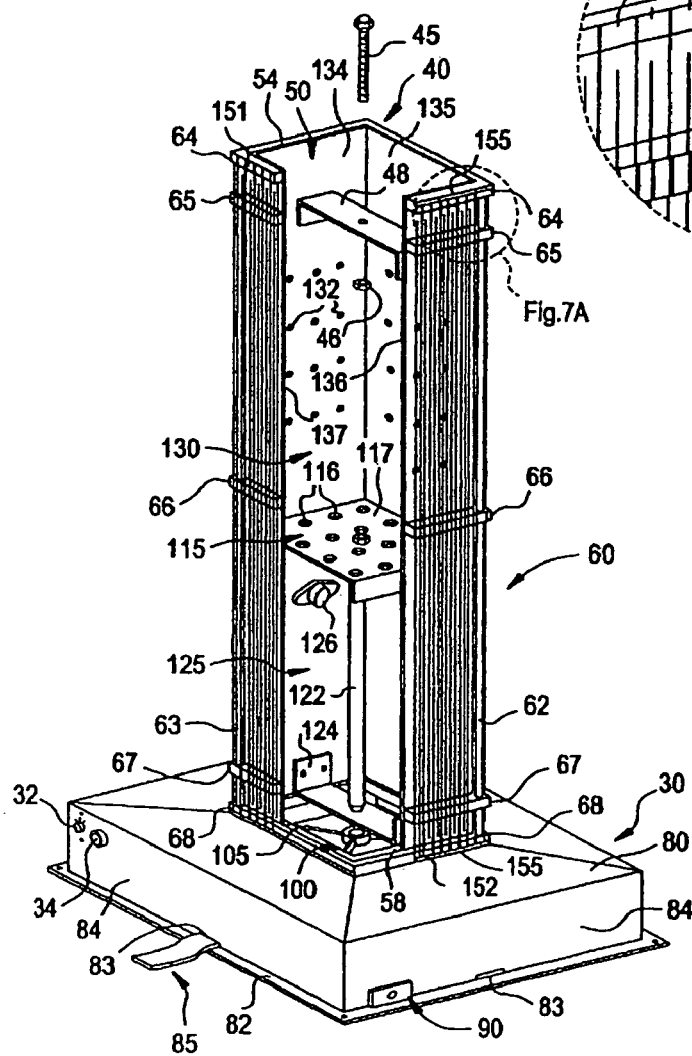

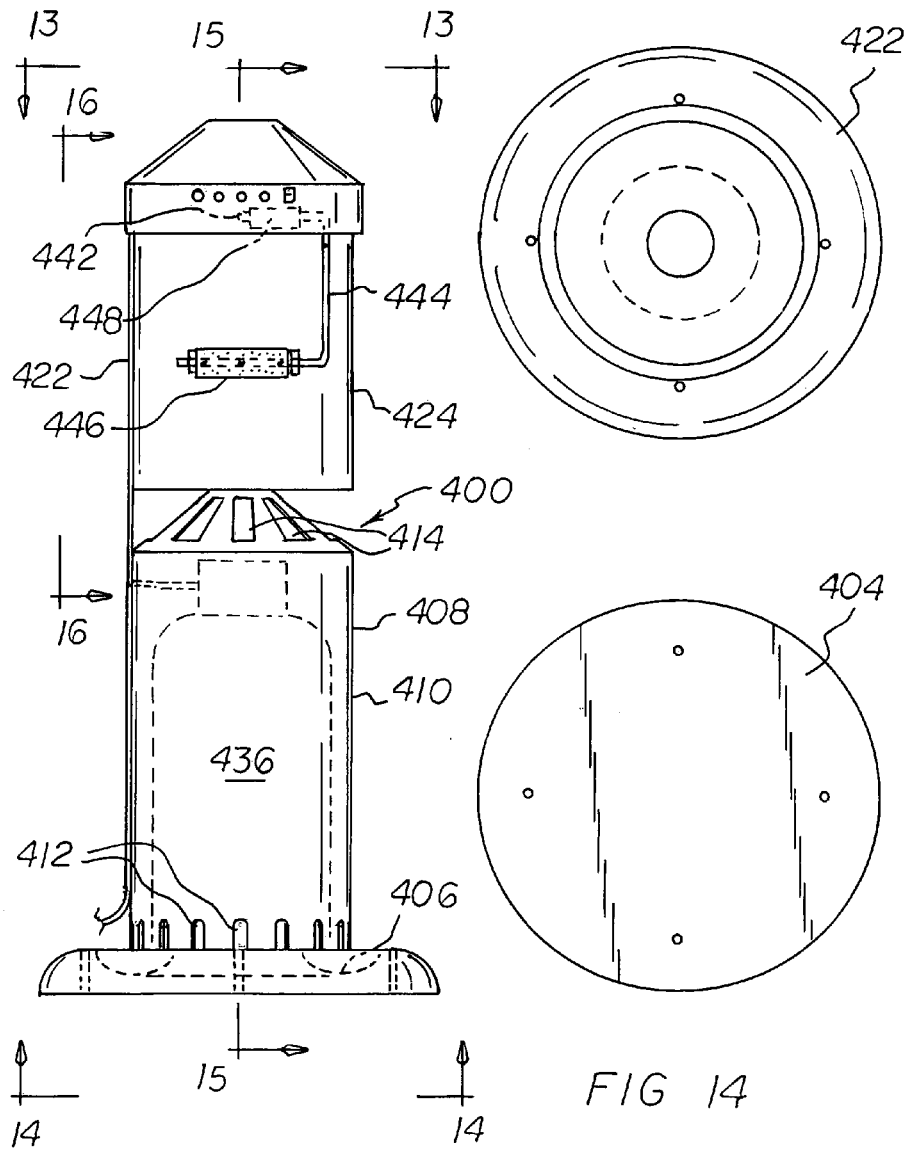

MIDGE/MOSQUITO TRAP SYSTEM

RELATED APPLICATIONS

This application is a continuation-in-part of application Ser. No. 10/445,584, filed May 27, 2003, now U.S. Pat. No. 7,832,140 which is, in turn, a continuation of application Ser. No. 09/009,122, filed Jan. 20, 1998, now U.S. Pat. No. 6,568,124, which is, in turn, a continuation-in-part of application Ser. No. 08/761,282, filed Dec. 6, 1996, now U.S. Pat. No. 6,050,025, which is a continuation-in-part of application Ser. No. 08/395,910, filed Feb. 28, 1995, now U.S. Pat. No. 5,595,018.

BACKGROUND OF THE INVENTION

1. Field of the Invention

The present invention relates to a midge/mosquito trap system and more particularly pertains to attracting and killing midges and mosquitos and a wide variety of other flying insects in a safe, convenient and economical manner.

2. Description of the Prior Art

The use of insect traps of known designs and configurations is known in the prior art. More specifically, insect traps of known designs and configurations previously devised and utilized for the purpose of trapping insects through known methods and apparatuses are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe midge/mosquito trap system that allows attracting and killing midges and mosquitos and a wide variety of other flying insects in a safe, convenient and economical manner.

In this respect, the midge/mosquito trap system according to the present invention substantially departs from the conventional concepts and designs of the prior art, and in doing so provides an apparatus primarily developed for the purpose of attracting and killing midges and mosquitos and a wide variety of other flying insects in a safe, convenient and economical manner.

Therefore, it can be appreciated that there exists a continuing need for a new and improved midge/mosquito trap system which can be used for attracting and killing midges and mosquitos and a wide variety of other flying insects in a safe, convenient and economical manner. In this regard, the present invention substantially fulfills this need.

SUMMARY OF THE INVENTION

In view of the foregoing disadvantages inherent in the known types of insect traps of known designs and configurations now present in the prior art, the present invention provides an improved midge/mosquito trap system. As such, the general purpose of the present invention, which will be described subsequently in greater detail, is to provide a new and improved midge/mosquito trap system and method which has all the advantages of the prior art and none of the disadvantages.

To attain this, the present invention essentially comprises a midge/mosquito trap system.

First provided is a base. The base has an upper surface. The base has an upwardly facing trough. The trough is in an annular configuration.

A recovery lower chamber is provided. The recovery lower chamber has an upper end. The recovery lower chamber has a lower end. The lower end is received and supported by the trough. The recovery lower chamber has a vertically extending cylindrically configured central extent. The lower end of the recovery lower chamber has lower slots. The lower slots extend from a lower location within the trough to an upper location above the trough. In this manner when water is within the trough and air flows through the lower slots from interior of the recovery lower chamber such air flow will become moisture laden. The upper end of the recovery lower chamber is in a frusto-conical configuration with upper slots. The upper end of the recovery lower chamber terminates at an elevated location in a circular support plate. The central extent of the recovery lower chamber has an interior surface with an open-cell lining. The open-cell lining is adapted to absorb and dispense moisture in response to the moisture laden air passing there across.

An upper chamber is provided. The upper chamber has an upper end and a lower end. The upper chamber has a vertically extending cylindrically configured central extent. The lower end of the upper chamber has an apertured lower circular reception plate. The lower circular reception plate is positioned on and coupled to the circular support plate. The upper end of the upper chamber is in a frusto-conical configuration. The upper chamber has an annular opening. The annular opening is provided between the upper end of the upper chamber and the central extent of the upper chamber.

Provided next is a fan. The fan is provided in the upper chamber. In this manner the air flow is directed in a recirculating path of travel downwardly through the upper chamber and the recovery lower chamber then outwardly through the lower slots in the lower end of the recovery lower chamber then upwardly to and through the annular opening in the upper chamber then downwardly again through the fan and the upper chamber.

A carbon dioxide tank is provided. The carbon dioxide tank is provided in the recovery lower chamber. In this manner a quantity of carbon dioxide is dispensed into the recirculating path of travel of the air flow. The carbon dioxide tank is chosen from the class of carbon dioxide tanks. The class of carbon dioxide tanks includes small tanks and large tanks and refillable tanks and non-refillable tanks.

A gaseous flow assembly is provided. The gaseous flow assembly includes a solenoid. The gaseous flow assembly includes an input line. The gaseous flow assembly also includes an output line. The input line couples the tank and the solenoid. The output line has an exterior extent on the upper chamber with apertures and a foam covering constituting a lower reservoir. The output line has an intermediate extent. The intermediate extent is provided in the annular opening. The intermediate extent has an aperture and a foam covering constituting an upper reservoir.

An ultrasound box is provided next. The ultrasound box is provided in the upper chamber. In this manner a heartbeat of a human is simulated. Further in this manner insects to be killed are attracted.

A cylindrical heater is provided. The cylindrical heater is provided in the upper chamber. In this manner the recirculating air and the carbon dioxide are heated.

Further provided are electrically charged screens. The electrically charged screens are provided in the lower end of the upper chamber. The electrically charged screens are adapted to electrocute and kill insects.

Provided last is a power source. A control assembly is provided. The power source and control assembly power and control the fan and the carbon dioxide tank and the ultrasound box and the heater and the screens. The controlling includes a cycle of carbon dioxide release of about 2 minutes followed by operation of the fan for about 1 minute. The cycle is repeated for about 5 hours. The operation of the heater and the operation of the ultra sound box are continuous during the cycle of the fan and the canister.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved midge/mosquito trap system which has all of the advantages of the prior art insect traps of known designs and configurations and none of the disadvantages.

It is another object of the present invention to provide a new and improved midge/mosquito trap system which may be easily and efficiently manufactured and marketed.

It is further object of the present invention to provide a new and improved midge/mosquito trap system which is of durable and reliable constructions.

An even further object of the present invention is to provide a new and improved midge/mosquito trap system which is susceptible of a low cost of manufacture with regard to both materials and labor, and which accordingly is then susceptible of low prices of sale to the consuming public, thereby making such midge/mosquito trap system economically available to the buying public.

Even still another object of the present invention is to provide a midge/mosquito trap system for attracting and killing midges and mosquitos and a wide variety of other flying insects in a safe, convenient and economical manner.

Lastly, it is an object of the present invention to provide a new and improved insect trap system. A chamber has upper end and lower ends. A base has an annular trough receiving and supporting the lower end of the chamber. When water is within the trough, air flowing through slots in the lower end of the chamber becomes moisture laden. A fan in the chamber directs the air flow in a recirculating path of travel. A carbon dioxide tank in the chamber dispenses carbon dioxide into the recirculating path of travel of the air flow. A solenoid has an input line coupling the tank and the solenoid and an output line with an exterior extent with apertures and a foam covering constituting a reservoir. A control assembly activates and inactivates the fan and the carbon dioxide tank in a timed sequence.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a partially fragmented isometric view similar to FIG. 2, with portions omitted for illustrative purposes.

FIG. 12 is a front elevational view of a midge/mosquito trap system constructed in accordance with the principles of the invention.

FIG. 13 is a plan view of the system taken along line 13-13 of FIG. 12.

FIG. 14 is a bottom view of the system taken along line 14-14 of FIG. 12.

The same reference numerals refer to the same parts throughout the various Figures.

DESCRIPTION OF THE PREFERRED EMBODIMENT

Figure 1:
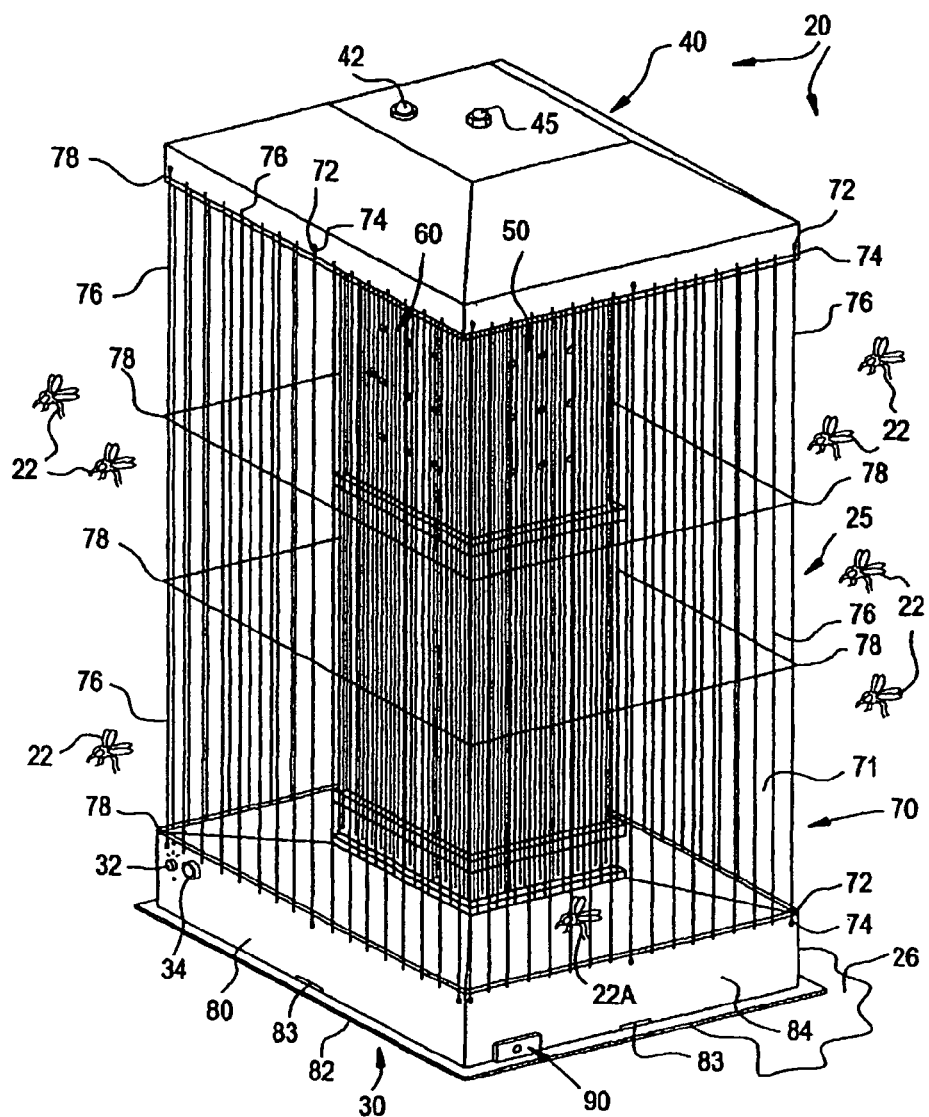
FIG. 1 is an isometric view of a mosquito killing apparatus according to an embodiment of the invention.

With reference now to the drawings, and in particular to FIG. 1 thereof, the preferred embodiment of the new and improved midge/mosquito trap system embodying the principles and concepts of the present invention and generally designated by the reference numeral 10 will be described.

The present invention, the midge/mosquito trap system 10 is comprised of a plurality of components. Such components in their broadest context include a chamber, a fan, a carbon dioxide tank and a solenoid. Such components are individually configured and correlated with respect to each other so as to attain the desired objective.

Referring more specially to the drawings, my improved mosquito killing system is generally designated by reference numeral 20. System 20 attracts mosquitoes 22 by actively projecting multiple infrared heat gradients and' pressure differentials coupled with a wide variety of aromatics that simulate animal body heat and breathing.

Figure 2:
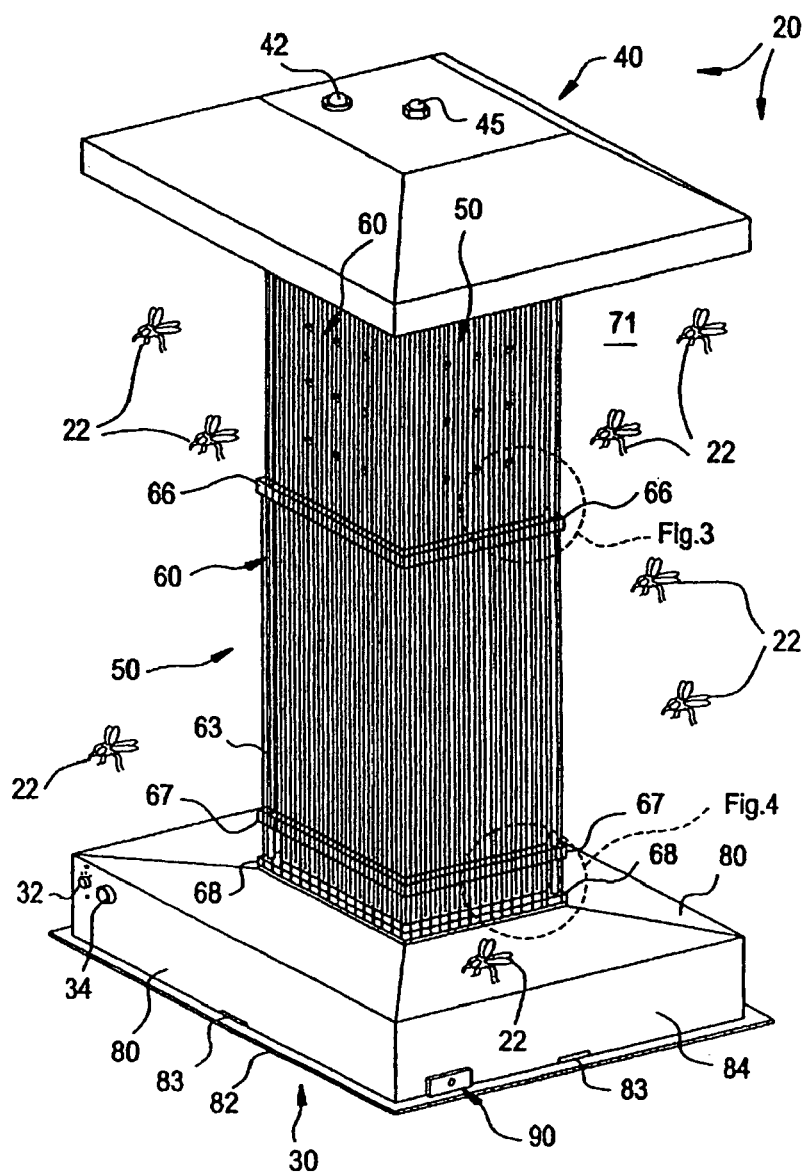
FIG. 2 is an isometric view similar to FIG. 1, but without safety guard 70.

System 20 comprises an elongated, generally parallelepiped housing 25 disposed upon a convenient supporting surface 26 (FIG. 1). The housing comprises a rectangular support base 30 and a spaced apart, truncated pyramidal roof 40 (FIGS. 1-2). The roof closes the tower interior. A switch 32 and photoelectric sensor system 34 control system operation, as discussed hereinafter. A pilot light 42 physically protrudes form roof 40 to indicate the operational status of system 20.

The roof 40 is secured to an internal heating tower 50 extending between the base 30 and the roof 40. A conventional bolt 45 extends through roof 40 to mate with a conventional nut 40. A cross member 48 secures roof 40 to tower 50 and base 30.

The tower 50 conducts air drawn into the base 30 into the upper portion of the housing and then forcefully projects it outwardly. A vertically oriented electrocution grid 60 is fixed to the outer perimeter of the tower 50. An outermost, safety wire mesh guard 70 surrounds the tower. It extends between the base and the roof to prevent accidental contact with the interior electrocution grid 60 or other internal components. An annular region 71 is defined between the guard 70 and tower 50; this region is traversed by mosquitoes 22, 22A (FIG. 1) passing through the guard. Several spaced apart terminal loops 72 and conventional screws 74 removably secure guard 70 to the base 30 and roof 40. The wire mesh comprises several vertically aligned, parallel, spaced apart stringers 76 reinforced by several parallel, regularly spaced apart horizontal cross members 78.

The base 30 preferably comprises a hollow, parallelepiped casing 80 (FIGS. 2, 7-8) that supports the housing 35. The casing 80 rests on plate 82. Casing 80 is penetrated by a plurality of intake orifices 83 for first admitting air into the system in response to fan suction. These preferably slit-shaped orifices 83 are regularly spaced about the casing periphery 84 for admitting air into the system. One slit 83 exposes a moist wick 85 to the exterior of the device. A scent drawer 90 also penetrates casing 80.

The scent drawer 90 contains gel 92 that simulates common smells attractive to mosquitoes or to the target insect. The gel 92 gradually releases pheromones (represented by dashed lines 98) into the casing interior 86 for mixture with the entering air currents (represented by dotted lines 108). Wick 85 supplies moisture (represented by dotted and dashed lines 88) to the casing interior, where it is mixed with the entering air currents 108. Casing interior 86 serves as a mixing chamber where the entering air 108 is intermixed with aromatics 98 and moisture 88.

An internal fan 100 forcefully draws air 108 through the slits 83 and into the casing 80. Preferably, the fan 100 has a relatively low volumetric output rate, in the range of ten to twenty cubic feet per minute (cfm), most preferably fifteen cfm. As air 108 is suctioned into the apparatus it is turbulently mixed with released aromatics 98 and emitted moisture 88 in the casing interior 86. Fan 100 is secured to plate 82 adjacent transformer 102. Preferably, the fan blades 105 are positioned immediately adjacent the tower bottom 58. Air forced upwardly by the fan is directly forced into the heating tower 50 and eventually rises to top 54. The resultant tower air stream is represented generally by arrows 118 (FIG. 8).

The tower 50 preferably comprises an elongated tubular conduit 110, preferably with a rectangular cross-section. The external surface 112 of the conduit 110 is obscured by electrocution grid 60. A plurality of spaced apart braces 64, 65, 66, 67 and 68 secure the electrocution grid to two elongated, vertically oriented parallel rods 62 and 63 that are parallel to the longitudinal axis of opposite tower corners 52 and 53. Of course, tower 50 could be cylindrical or another configuration as long as vertical air flow through tower 50 remains.

Figure 8:
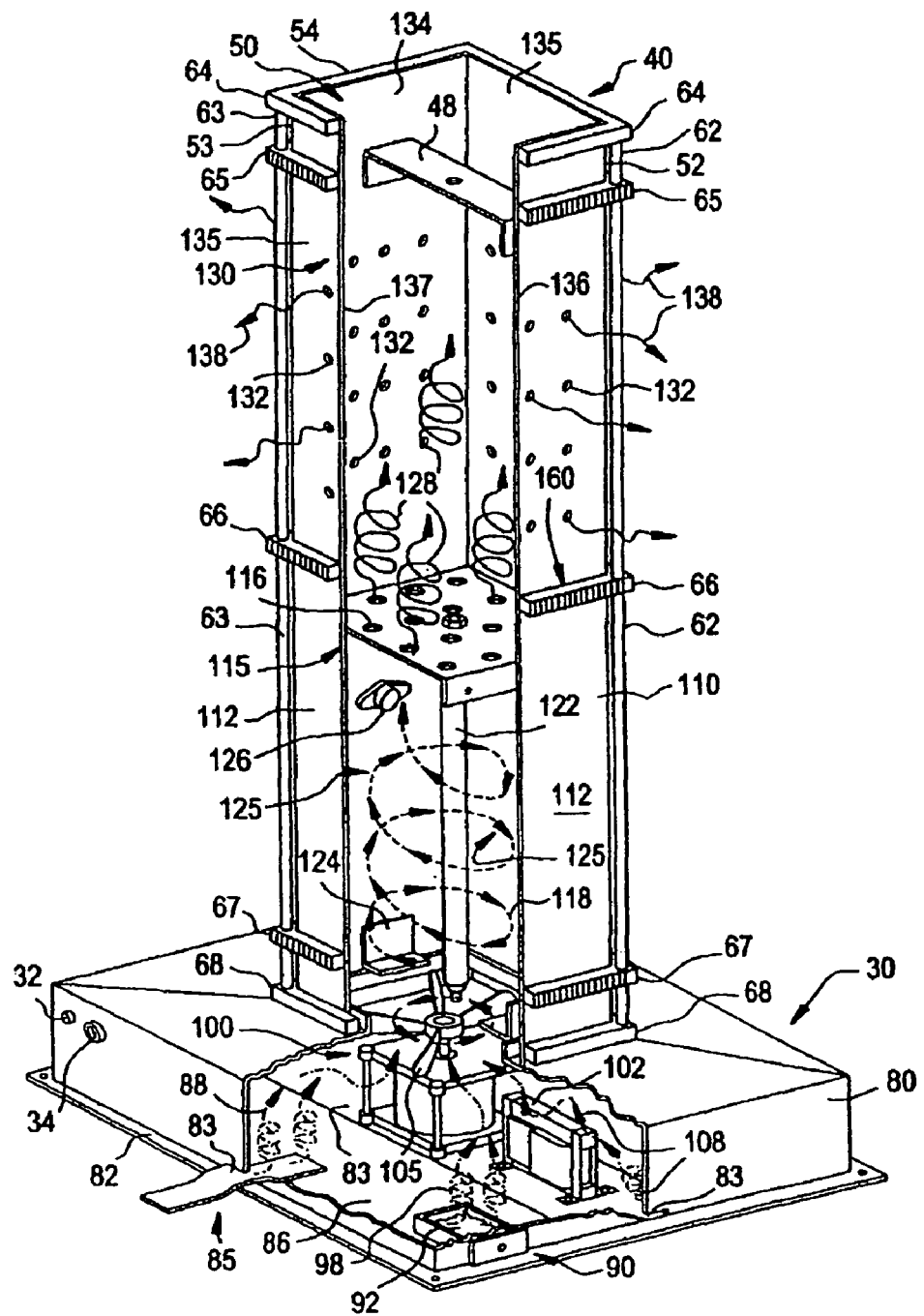
FIG. 8 is a partially fragmented isometric view similar to FIG. 7, with portions omitted for illustrative purposes.

An internal, perforated baffle 115 divides the tower 50 into adjacent, lower and upper tubular sections 120 and 130 respectively (FIG. 8). Tower section 120 defines an enclosed heating chamber 125 The upper tower section 130 defines an adjacent dispersal chamber 135. In effect the baffle 115 comprises a restrictor plate between the chambers that affects the internal tower airflow 118. It establishes an internal pressure differential between the chambers. Because of the preferred baffle design, denser, warmer air in the lower chamber is at a higher pressure than air above. The tower air pressure differential, and the temperature and pressure gradients established with the preferred construction I have detailed are important. These synergistically enhance the ability of the system to emulate the infrared signature of a live, breathing animal that is attractive to insects. In other words, I have found that this arrangement produces infrared images that simulate the presence of breathing animals, including human beings, fowl and the like.

The lower tower section 120 houses an elongated, cylindrical, resistive electric heater 122 that warms air within the heating chamber. Baffle 115 restricts the upward airflow to ensure that the residence time of the air 118 in the lower section 120 is adequate to heat the air sufficiently (preferably to a temperature between 100 and 120 degrees Fahrenheit). Preferably, heater 122 centrally extends along the longitudinal axis of section 120 between bottom 58 baffle 115. Heater 122 is supported at one end by a strut 124 extending across bottom 58 above fan 100. The opposite end of heater 122 is supported by brace 115.

This turbulent air 118 is heated as it travels past heater 122. A thermostat 126 controls the operation of heater 122 by monitoring tower temperature. Thermostat 126 is preferably mounted adjacent baffle 115 with its thermostatic element in thermal contact with the tower. Of course, the extent to which the air is heated depends upon prevalent external environmental conditions, as will be discussed more thoroughly hereinafter.

Baffle 115 increases the internal tower pressure differential. As air 118 flows up conduit 110, baffle 115 restricts its flow. Several holes 116 penetrate the plate 117 comprising baffle 115. These holes 116 permit air 118 to eventually cross into top section 130. Consequently, the pressure of the air (indicated by arrows 128) entering the upper section 130 is increased by the restriction of baffle 115. Thus, heated air 128 both a higher temperature and a higher pressure than entering air 108.

Air 128 entering the upper section 130 is eventually dispersed into housing 25 and the immediately surrounding area. As air 128 enters the upper section 130 from the bottom section 120, it flows through a plurality of regularly spaced apart discharge orifices 132 penetrating the upper section walls 134, 135, 136 and 137 beneath the roof. The discharge orifices pass heated, slightly pressured air outwardly in small turbulent streams (as indicated by arrows 138). The air streams 138 emitted from the orifices into the housing are strongest within the interior annulus 71. The multitude of air streams established thereby create the appearance of animal breathing. In addition there are thermal and pressure gradients surrounding the housing 25. These gradients additionally simulate human breathing, and the resultant thermal pattern attracts mosquitoes who mistake it for the infrared signature of an animal, including a human being, fowl or the like.

Figure 3:
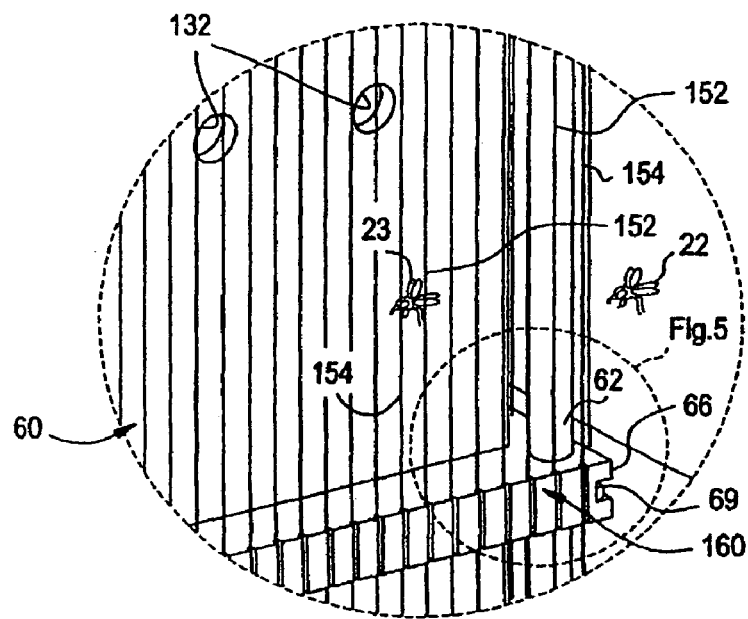
FIG. 3 is an enlarged view of the upper circled area of FIG. 2.
Figure 4:
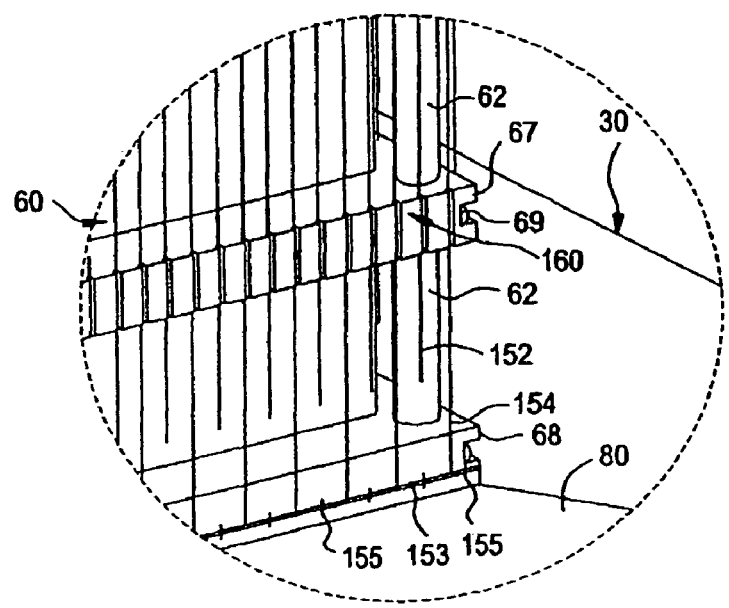
FIG. 4 is an enlarged view of the lower circled area of FIG. 2.
Figure 5:
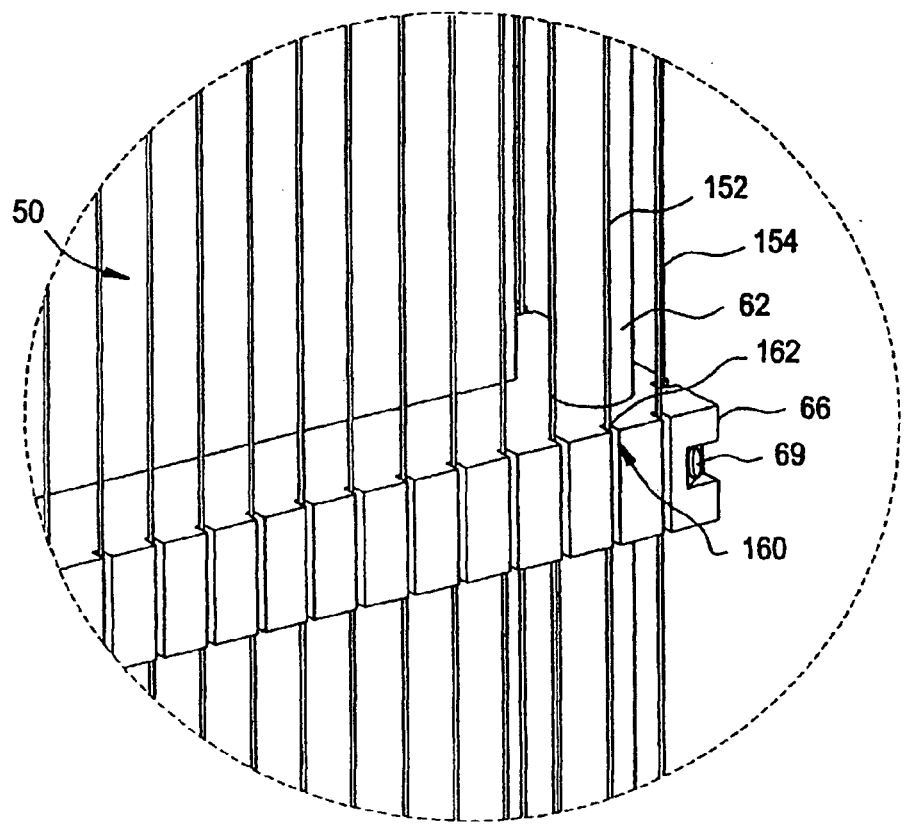
FIG. 5 is an enlarged view of the circled area of FIG. 3.

Attracted mosquitoes 22 are electrocuted (i.e., mosquito 23 shown in FIG. 3) when they approach the tower 50 by the electrocution grid 60 surrounding the exterior conduit surface 112. The electrocution grid 60 comprises a vertically oriented wire network 150. Multiple spaced apart electrically conductive stringers 152 extend downwardly from top brace 64 and main line 151 with corresponding spaced apart electrically conductive stringers 154 protruding upwardly from bottom braces 68 (FIGS. 4 and 7A). A plurality of staples 155 secure both main lines 151, 153 to respective braces 64 and 68.

The downwardly oriented and upwardly oriented stringers 152 and 154 alternate. In other words, an upward stringer 154 extends between each downward stringer 152 (FIG. 7A). Whenever an object touches a downward and an upward stringer 152 and 154, it creates a short circuit that electrifies the object, such as mosquito 23.

Figure 6:
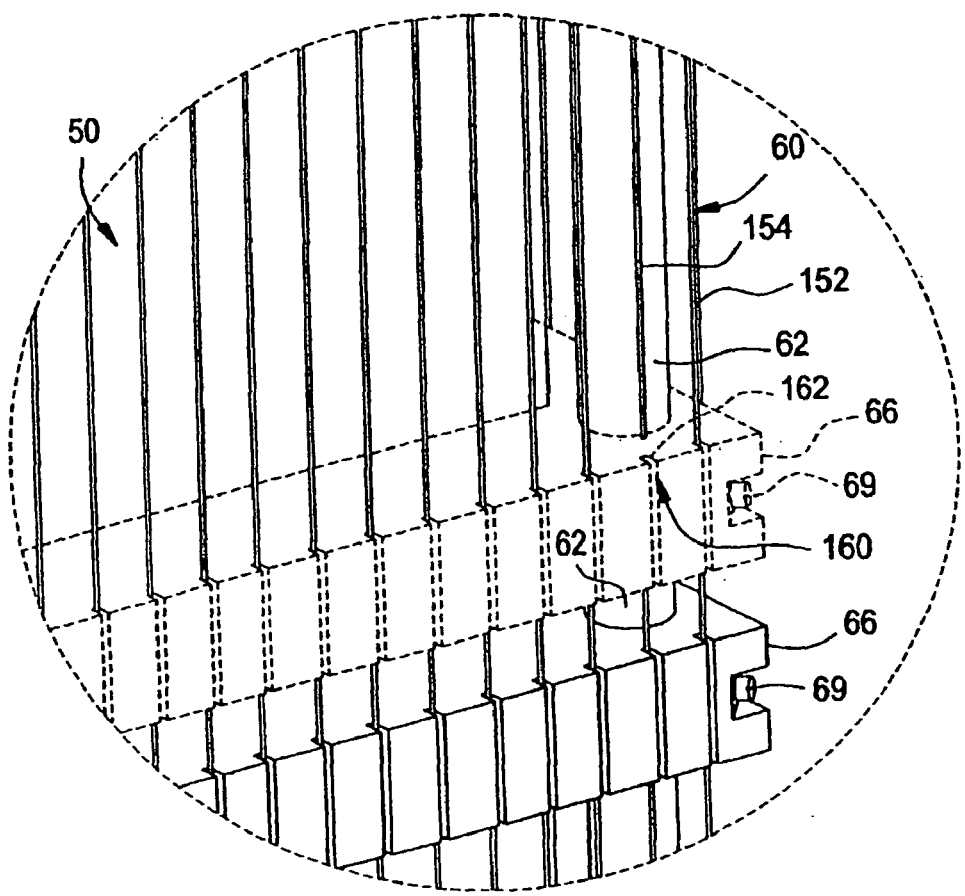
FIG. 6 is an enlarged, partially phantom view similar to FIG. 5, illustrating movement of brace 66 by loosening set screw 69.

After electrocution, the insects (i.e. mosquitoes) are generally disintegrated. Other remains generally fall toward the base 80 where they are typically swept away by winds, etc. However, when necessary, the middle braces 65, 66 and 67 may all be manually manipulated to clean the grid 60. A set screw 69 normally retains the braces in place. Set screw 69 tightens against rod 62 or 63 to secure the brace 64-68. Set screw 69 may be loosened to move braces 65, 66 or 67 upwardly or downwardly to clean stringers 152 and 154 as shown in FIG. 6. A groove 160 extending through braces 65, 66 and 67 receives the stringers 152 and 154. The stringers 152 and 154 slide along the grooves 160 with lip 162 removing any debris thereon.

Figure 9:
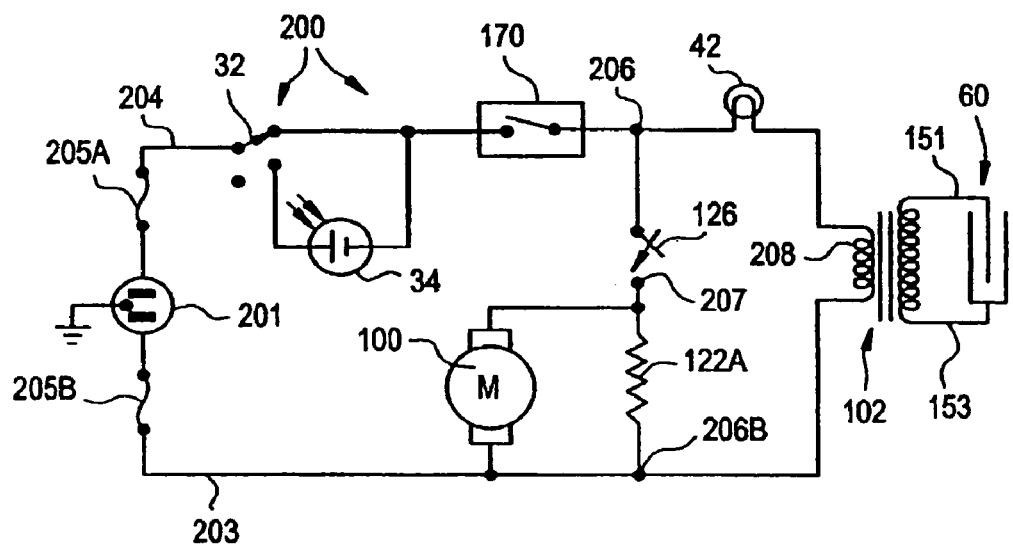
FIG. 9 is a schematic diagram of the electrical circuitry according to an embodiment of the invention.

With primary emphasis now directed to FIG. 9, the preferred electrical control circuit has been designated by the reference numeral 200. Nominally 120 volt A.C. voltage is supplied to the circuitry with a standard three-prong plug 201. Voltage is transmitted across input lines 203, 204 through fuses 205A and 205B. Switch 32 may be user selected to apply power directly to tilt-over safety switch 170. Alternatively, switch 32 may direct voltage via photoelectric switch system 34 to switch 170 or it may be switched "off". System 34 automatically energizes and controls the apparatus depending upon ambient light conditions. Safety tilt-over switch 170 disables the apparatus when the tower is tipped over approximately thirty degrees from vertical.

Voltage applied to node 206 is applied to a thermostat-controlled switch 126. Switch 126 applies voltage to node 207 to energize both motor 100 and resistive heating element 122A. Voltage on node 206 also energizes the primary 208 of high-voltage transformer 102. As long as there is voltage across nodes 206, 206B the pilot light 42 will be energized as well. High voltage outputted from the transformer across lines 151 and 153 electrifies the electrocution grid 60 previously discussed.

For best results the device should be operated during the night. It should be placed away from humans. During daylight hours it is preferably placed in the shade. During operation system 20 attracts mosquitoes 22 by projecting air 138 outwardly from tower 50. Air 138 comprises a mixture of moisture 88, aromatics 98 and heated and pressurized air 128. The projected air 138 creates several thermal and pressure gradients around housing 25 that simulate human breathing and body heat. The aromatics 98 and moisture 88 further enhance the simulation of a live animal such as a human or fowl.

The system 20 first draws air 108 into base 30 through several slits 83 as a result of the operation of a fan 100. Of course switch 32 must be activated. As air 108 enters the casing interior 86, it mixes with aromatics 98 escaping from drawer 90 and moisture 88 from wick 85. The mixed air is then blown upwardly into heating tower 50.

As the blown air 118 enters the tower section 120, it passes an electric heater 122. Heater 122 warms air 118 to a preselected temperature as determined by thermostat 126. The heated air 118 is also slightly pressurized by baffle 115 as it moves into dispersal chamber 130.

Air 128 moving into chamber 130 is projected outwardly through several orifices 132. As air leaves chamber 130, it begins cooling and depressurizing as it moves outwardly. Cooled and depressurized air 138 establishes multiple thermal and pressure gradients once outside tower 50. Even more thermal and pressure gradients are created once air 138 leaves housing 25.

The multiple gradients attract mosquitoes 22. As attracted mosquitoes 22 enter housing 25 through guard 70, they alight upon grid 60 where they are subsequently disintegrated (i.e. Mosquito 23). Since system 20 attracts mosquitoes without ultraviolet light, beneficial insects and other insects are not attracted to system 20. In other words, since system 20 uses the infrared spectrum to attract target insects such as mosquitoes, the system 20 does not attract large numbers of non-target insects.

Experience dictates that the air 138 passing guard 70 should approximate 100 degrees Fahrenheit. In other words, on windy or cold days, the thermostat 126 should run heater 122 longer than warm, hot days.

Figure 10:
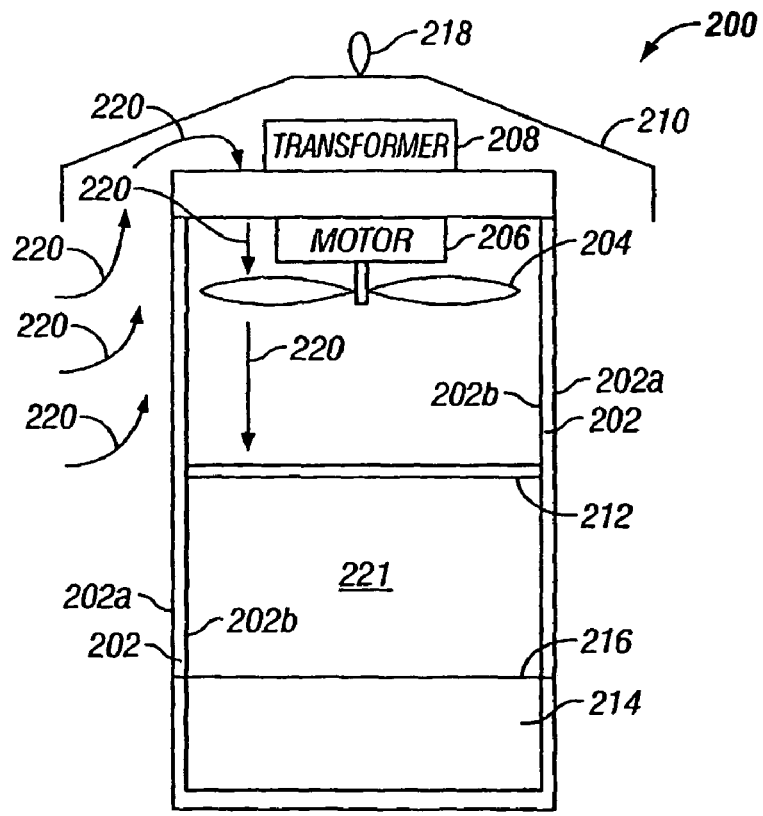
FIG. 10 is a partial cross-sectional view of a mosquito killing apparatus according to an embodiment of the invention.

FIG. 10 shows a second preferred embodiment of the invention. According to this embodiment, apparatus 200 provides a heated air space 202 between outer wall 202a and inner wall 202b of the main body of the apparatus 200. Space 202 may reheated by any appropriate mechanism such as a heating tube, resistive conductors, or equivalent heat producing mechanisms, such as heater 122 as shown in FIGS. 7 and 8. The heated space 202 creates a heat blanket or gradient around the periphery of the apparatus, which attracts mosquitoes to the outer surface 202a. A fan 204 driven by a motor 206 causes the air flow in the direction of arrows 220, from the vicinity of outer surface 202a and down into interior chamber 221 of the apparatus 200 thorough an opening between a canopy 210 and the top of the main body of the apparatus 200.

An electrocution grid 212 is provided in the interior chamber 221. Mosquitoes are attracted to the surface 202a by the surrounding heat and are sucked into the apparatus by air currents 220, where they are forced down onto the grid 212 and electrocuted. Mosquito remains then fall into a removable trap 214, which is removed from the bottom of the apparatus 200 for disposal. A wire mesh 216 covers the bottom of the apparatus to prevent access to the interior.

The embodiment of FIG. 10 provides a measure of safety by placing the electrocution grid inside the body of the apparatus, precluding inadvertent contact by humans. The electrocution grid is mounted horizontally so that mosquito remains fall into trap 24 through the force of gravity, eliminating the need to periodically clean the electrocution grid.

Figure 11:
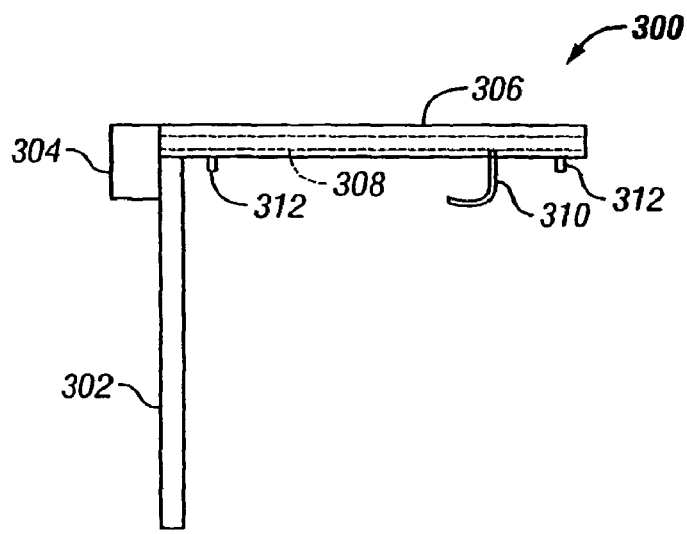
FIG. 11 is a partially broken view of a motion pole used in conjunction with the embodiment of FIG. 10.
Figure 15:
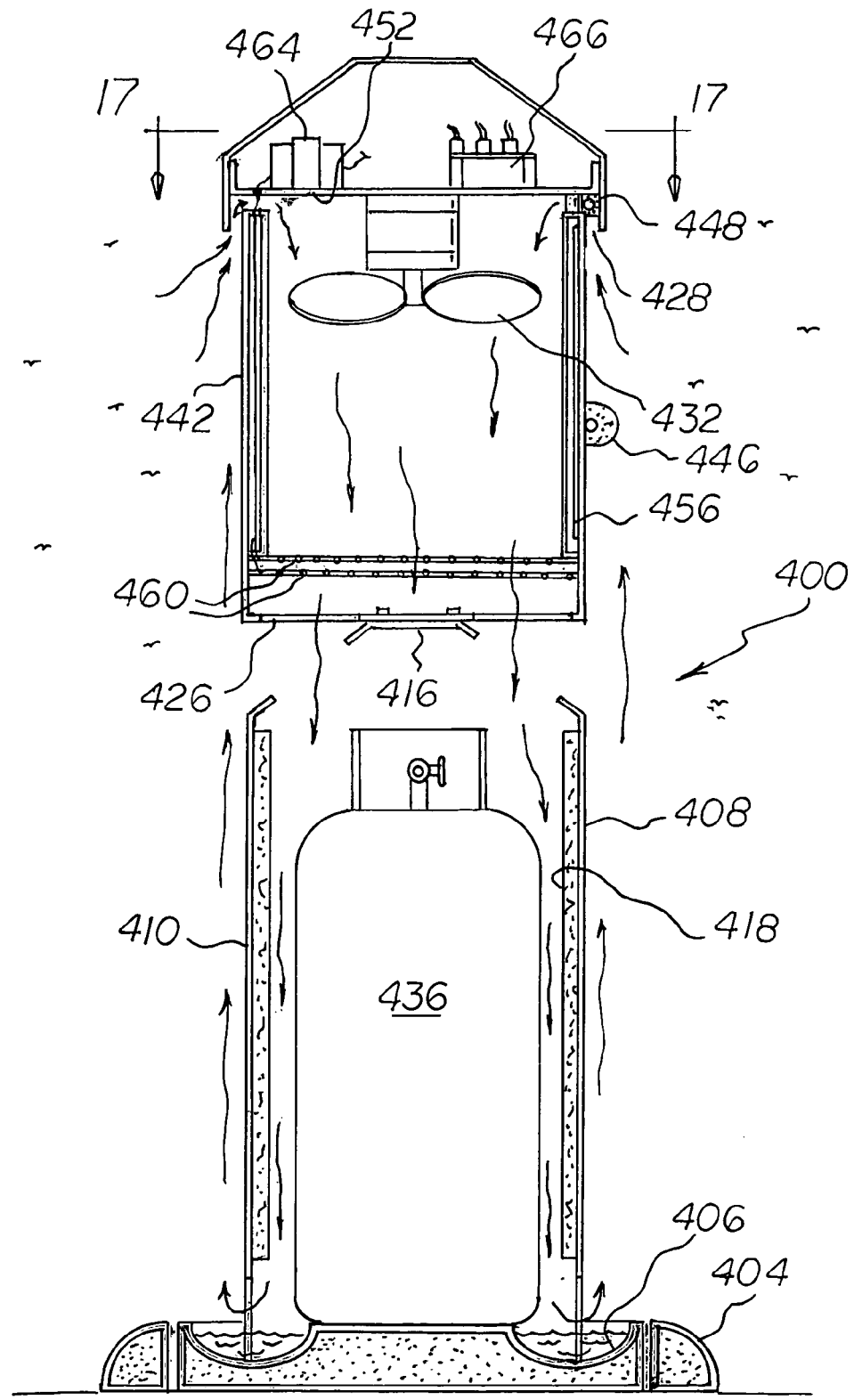
FIG. 15 is a cross sectional view of the system taken along line 15-15 of FIG. 12.
Figure 16:
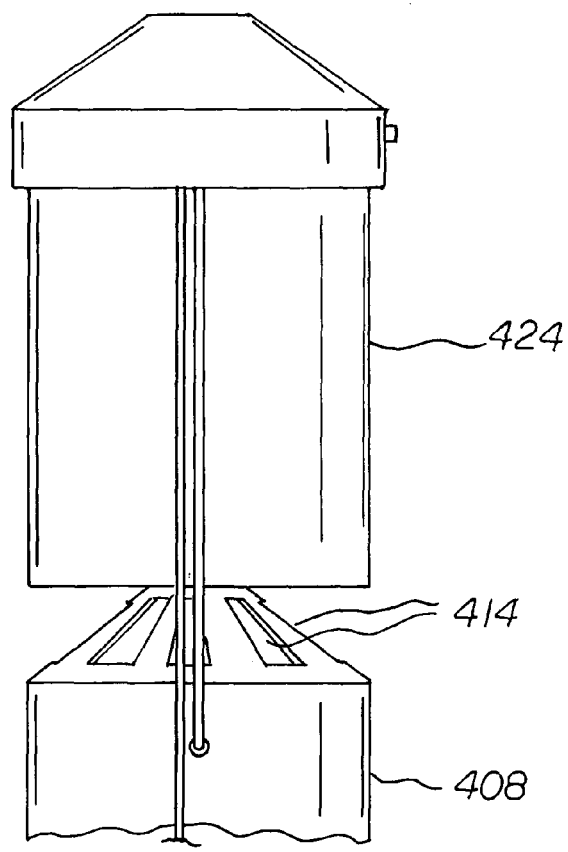
FIG. 16 is a side elevational view taken along line 16-16 of FIG. 12.
Figure 17:
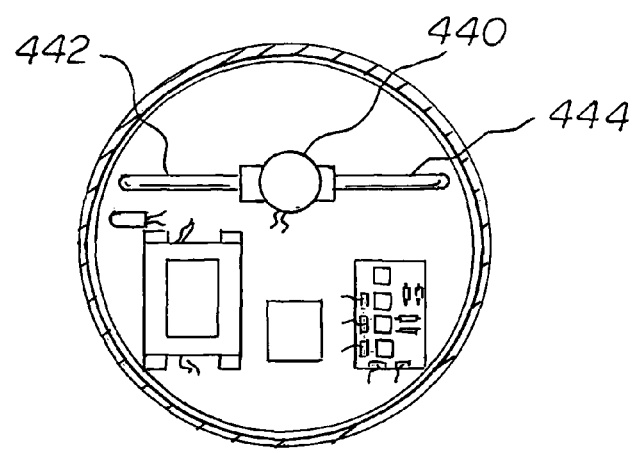
FIG. 17 is a cross sectional view of the system taken along line 17-17 of FIG. 15.

FIG. 11 shows a motion pole 300 for use with a mosquito killing apparatus according to the embodiments of the invention, and in particular with the embodiment of FIG. 10. Motion pole 300 includes a vertical arm 302 for placement in the ground or mounting on a floor, and a horizontal arm 306. Arm 306 contains a track in which an auger screw 308 is installed. Screw 308 is coupled to a motor 304 for rotating the screw 308. A hook 310 is connected to the auger screw and is moved along the length of arm 306 as the screw is rotated by the motor. A pair of limit switches 312 are provided near the ends of arm 306 and function to reverse the direction of the motor when they are activated by coming into contact with hook 310. A suitable attachment mechanism such as loop 218 is provided on the apparatus 200 for engagement with the hook 310. Alternatively, hook 310 may be inserted into an eyelet provided in the top of the apparatus 200.

In operation, the apparatus 200 slowly transverses the path between the limit switches 312 on the horizontal arm 306, simulating motion of a living animal, which provides an attractant to mosquitoes in the surrounding area.

A final embodiment of the invention is shown in FIGS. 12-17.

First provided is a base 404. The base has an upper surface. The base has an upwardly facing trough 406. The trough is in an annular configuration.

A recovery lower chamber 408 is provided. The recovery lower chamber has an upper end. The recovery lower chamber has a lower end. The lower end is received and supported by the trough. The recovery lower chamber has a vertically extending cylindrically configured central extent 410. The lower end of the recovery lower chamber has lower slots 412. The lower slots extend from a lower location within the trough to an upper location above the trough. In this manner when water is within the trough and air flows through the lower slots from interior of the recovery lower chamber such air flow will become moisture laden. The upper end of the recovery lower chamber is in a frusto-conical configuration with upper slots 414. The upper end of the recovery lower chamber terminates at an elevated location in a circular support plate 416. The central extent of the recovery lower chamber has an interior surface with an open-cell lining 418. The open-cell lining is adapted to absorb and dispense moisture in response to the moisture laden air passing there across.

An upper chamber 422 is provided. The upper chamber has an upper end and a lower end. The upper chamber has a vertically extending cylindrically configured central extent 424. The lower end of the upper chamber has an apertured lower circular reception plate 426. The lower circular reception plate is positioned on and coupled to the circular support plate. The upper end of the upper chamber is in a frusto-conical configuration. The upper chamber has an annular opening 428. The annular opening is between the upper end of the upper chamber and the central extent of the upper chamber.

Provided next is a fan 432. The fan is provided in the upper chamber. In this manner the air flow is directed in a recirculating path of travel downwardly through the upper chamber and the recovery lower chamber then outwardly through the lower slots in the lower end of the recovery lower chamber then upwardly to and through the annular opening in the upper chamber then downwardly again through the fan and the upper chamber.

A carbon dioxide tank 436 is provided. The carbon dioxide tank is provided in the recovery lower chamber. In this manner a quantity of carbon dioxide is dispensed into the recirculating path of travel of the air flow. The carbon dioxide tank is chosen from the class of carbon dioxide tanks. The class of carbon dioxide tanks includes small tanks and large tanks and refillable tanks and non-refillable tanks.

A gaseous flow assembly is provided. The gaseous flow assembly includes a solenoid 440. The gaseous flow assembly also includes an input line 442. The gaseous flow assembly also includes an output line 444. The input line couples the tank and the solenoid. The output line has an exterior extent on the upper chamber with apertures and a foam covering constituting a lower reservoir 446. The output line has an intermediate extent. The intermediate extent is provided in the annular opening. The intermediate extent has an aperture and a foam covering constituting an upper reservoir 448.

An ultrasound box 452 is provided next. The ultrasound box is provided in the upper chamber. In this manner a heartbeat of a human is simulated. Further in this manner insects to be killed are attracted.

A cylindrical heater 456 is provided. The cylindrical heater is provided in the upper chamber. In this manner the recirculating air and the carbon dioxide are heated.

Further provided are electrically charged screens 460. The electrically charged screens are provided in the lower end of the upper chamber. The electrically charged screens are adapted to electrocute and kill insects.

Provided last is a power source 464. A control assembly 466 is provided. The power source and control assembly power and control the fan and the carbon dioxide tank and the ultrasound box and the heater and the screens. The controlling includes a cycle of carbon dioxide release of about 2 minutes followed by operation of the fan for about 1 minute. The cycle is repeated for about 5 hours. The operation of the heater and the operation of the ultra sound box are continuous during the cycle of the fan and the canister.

In the prior art, the CO2 is released at the four orifices for two minutes while the fan is off mixing with the heated air, then the fan comes on for one minute and this is repeated for 5 hours. When the fan comes on to vacuum in the midges and mosquitoes into the unit, it also blows away the heated gaseous attractions away from the unit which quickly dissipates. The release of the heated gaseous attractants without any control or direction, attracts midges and mosquitoes to the area of the unit and then the midges and mosquitoes follow the gaseous and heated air flow away from the unit. The addition of the recovery chamber and control of the lost attractants by 66.5 percent causes the midges and mosquitoes to stay at the unit and be captured. The CO2 being released for 2 minutes will now fall into the new recovery chamber with open cell liner that will be recirculated. The midges and mosquitoes are attracted to the recovery chamber and when the fan starts recirculating the attractants, the midges and mosquitoes will follow the attractants and be trapped or electrocuted.

The new water reservoir of the present invention actually puts moisture into recirculated attractants. The air flow now passes over the water and enhances the other attractants producing a larger rate of kill. In the prior art there was no way to add moisture to the attractants.

The new reservoir will also be used to mix the attractants, such as lemon and other fragrances that will mix with the other attractants in the in the recirculated air flow to which the midges and mosquitoes are attracted.

The gaseous reservoirs of the present invention for the main and the body are open cell material, like a sponge. The gaseous attractant is released into the open cell gaseous reservoirs and absorbed, allowing the attractant to be slowly and continuously released out. In the prior art the attractant was released out into the air with no control and lost.

The ultrasound device of the present invention pumps liquid through a tube recirculating to mimic the sound of a heart beat is incorporated with the gaseous air flow that mimics breathing as well as the heat that mimics body temperature.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An insect trap system comprising:
    a chamber having upper and lower ends, a base having an annular trough receiving and supporting the lower end of the chamber, the lower end of the chamber having slots whereby when water is within the trough air flowing through the slots will become moisture laden;
    a fan in the chamber to direct the air flow in a recirculating path of travel;
    a carbon dioxide tank in the chamber to dispense carbon dioxide into the recirculating path of travel of the air flow;
    a solenoid with an input line and an output line, the input line coupling the tank and the solenoid, the output line having an exterior extent with apertures and a foam covering constituting a reservoir; and
    a control assembly to activate and inactivate the fan and the carbon dioxide tank in a timed sequence.

2. The system as set forth in claim 1 wherein the chamber includes a lower chamber containing the tank and an upper chamber containing the fan.

3. The system as set forth in claim 1 and further including an electrical screen in the chamber for electrocuting the insects.

4. A midge/mosquito trap system for attracting and killing midges and mosquitos and a wide variety of other flying insects, the system comprising, in combination:
    a base having an upper surface with an upwardly facing trough in an annular configuration;
    a recovery lower chamber having an upper end, a lower end received and supported by the trough, and a vertically extending cylindrically configured central extent, the lower end of the recovery lower chamber having lower slots extending from a lower location within the trough to an upper location above the trough whereby when water is within the trough and air flows through the lower slots from interior of the recovery lower chamber such air flow will become moisture laden, the upper end of the recovery lower chamber being in a frusto-conical configuration with upper slots, the upper end of the recovery lower chamber terminating at an elevated location in a circular support plate, the central extent of the recovery lower chamber having an interior surface with an open-cell lining adapted to absorb and dispense moisture in response to the moisture laden air passing there across;
    an upper chamber having an upper end and a lower end and a vertically extending cylindrically configured central extent, the lower end of the upper chamber having an apertured lower circular reception plate positioned on and coupled to the circular support plate, the upper end of the upper chamber being in a frusto-conical configuration with an annular opening between the upper end of the upper chamber and the central extent of the upper chamber;
    a fan in the upper chamber to direct the air flow in a recirculating path of travel downwardly through the upper chamber and the recovery lower chamber then outwardly through the lower slots in the lower end of the recovery lower chamber then upwardly to and through the annular opening in the upper chamber then downwardly again through the fan and the upper chamber;
    a carbon dioxide tank in the recovery lower chamber to dispense a quantity of carbon dioxide into the recirculating path of travel of the air flow, the carbon dioxide tank being chosen from the class of carbon dioxide tanks including small tanks and large tanks and refillable tanks and non-refillable tanks;
    a gaseous flow assembly including a solenoid with an input line and an output line, the input line coupling the tank and the solenoid, the output line having an exterior extent on the upper chamber with apertures and a foam covering constituting a lower reservoir, the output line having an intermediate extent in the annular opening with an aperture and a foam covering constituting an upper reservoir;
    an ultrasound box in the upper chamber to simulate a heartbeat of a human for attracting insects to be killed;
    a cylindrical heater in the upper chamber to heat the recirculating air and the carbon dioxide;
    electrically charged screens in the lower end of the upper chamber adapted to electrocute and kill insects; and
    a power source and control assembly for powering and controlling the fan and the carbon dioxide tank and the ultrasound box and the heater and the screens, the controlling including a cycle of carbon dioxide release of about 2 minutes followed by operation of the fan for about 1 minute, the cycle being repeated for about 5 hours, the operation of the heater and the operation of the ultra sound box being continuous during the cycle of the fan and the canister.

* * * * *